DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED MAY 6, 1975

934 OG 7

T934,002
TENSOMETER
George Cheatham Trail, Jr., 138 Doversbire Drive, Matthews, N.C. 28105
Continuation of application Ser. No. 292,569, Sept. 27, 1972. This application Sept. 24, 1973, Ser. No. 400,452
Int. Cl. G01l *5/10*
U.S. Cl. 73—144
1 Sheet Drawing. 10 Pages Specification

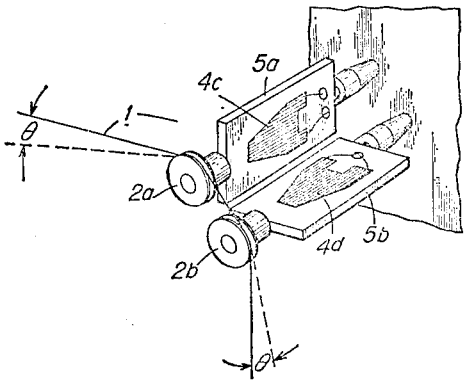

An improved electro-mechanical threadline-tensometer that gives an indicated tension that is largely independent of the error angle between the calibration position and the actual position of the tensometer in use, is provided by having at least one pair of conventional strip-cantilever tensometer heads mounted perpendicular to each other. In the most preferred embodiment the axes of heads are merely parallel rather than being in-line, and the calibration position is such that the calibrating load causes equal deflection in each of the strip cantilevers. The percentage error in indicated tension, caused by an error angle of $\theta$ in positioning the tensometer in actual use, is less than 0.5% for $\theta$ of $\pm 5°$; less than 1.5% for $\theta$ of $\pm 10°$; and less than 3.5% for $\theta$ of $\pm 15°$.

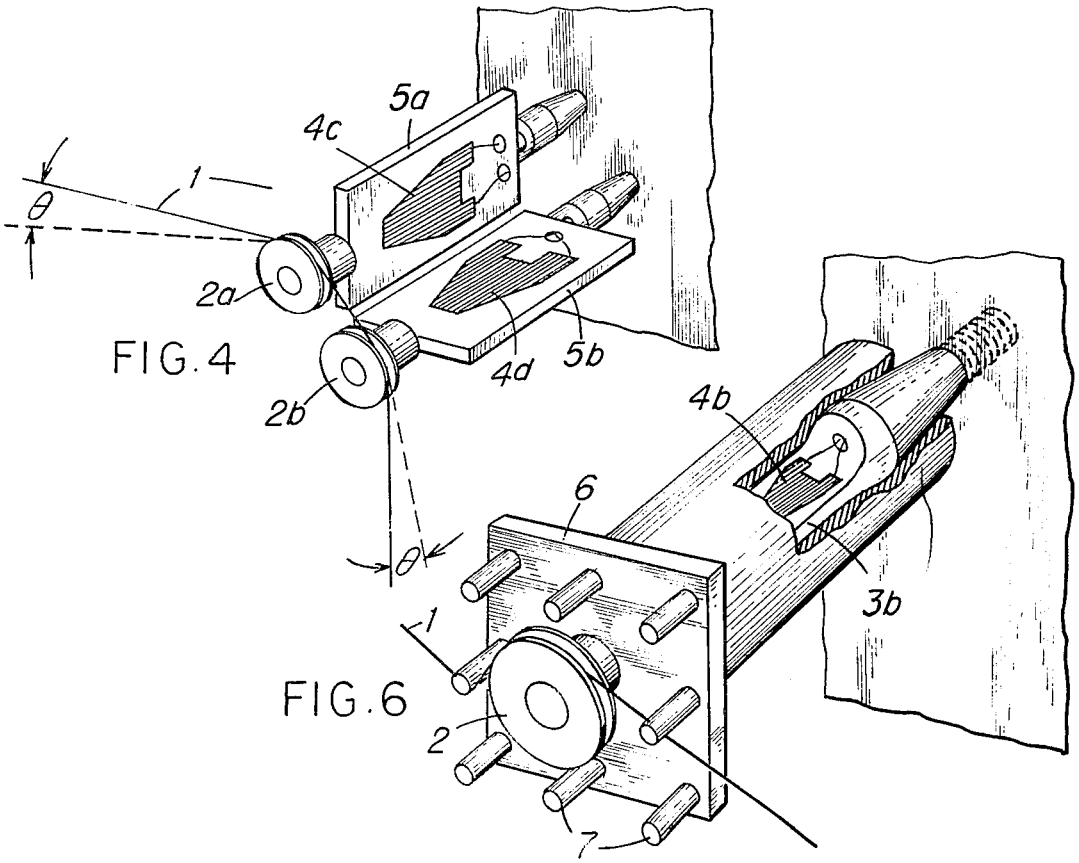

TENSOMETER
Original Filed Sept. 27, 1972
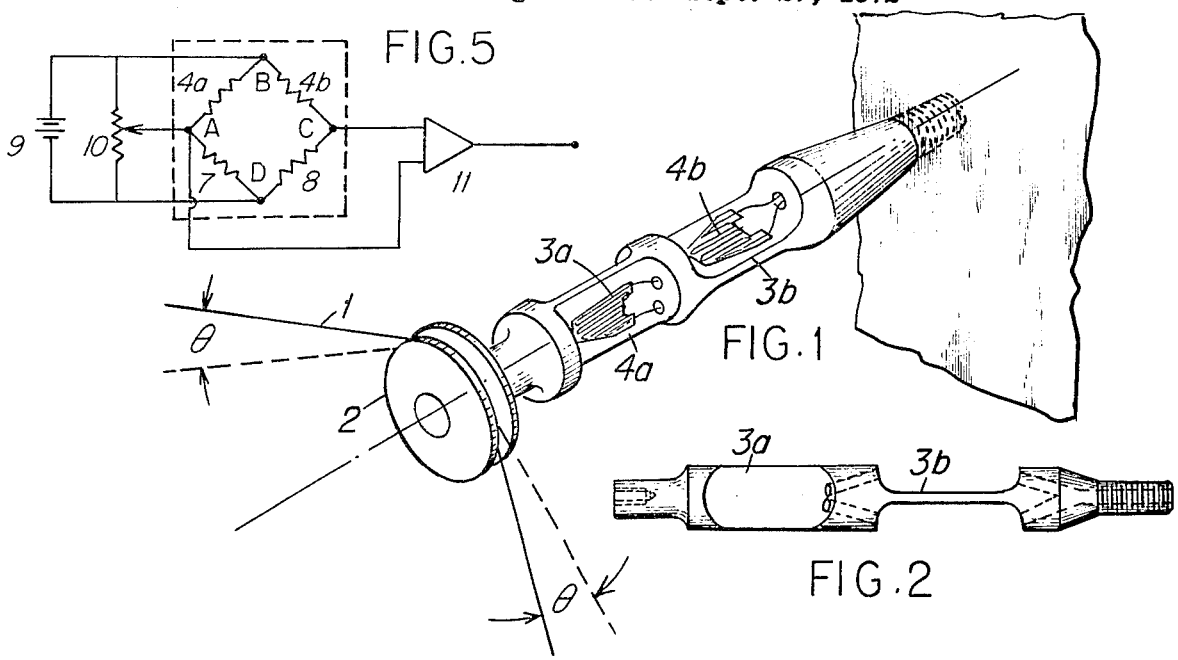
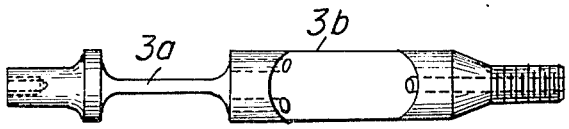
FIG.3